United States Patent [19]
Wu et al.

[11] Patent Number: 5,407,979
[45] Date of Patent: Apr. 18, 1995

[54] BIODEGRADABLE FILM AND METHOD OF MAKING SAME

[75] Inventors: Pai-Chuan Wu, Cincinnati; Gene W. Palmer, Manchester, both of Ohio; Wendell R. High, Augusta, Ky.

[73] Assignee: Clopay Plastic Products Company, Inc., Cincinnati, Ohio

[21] Appl. No.: 58,989

[22] Filed: May 6, 1993

Related U.S. Application Data

[63] Continuation of Ser. No. 741,321, Aug. 7, 1991, abandoned.

[51] Int. Cl.$^6$ ............................. C08J 3/20; C08L 3/00
[52] U.S. Cl. ......................................... 524/47; 524/51; 524/52; 523/124; 264/210.7; 264/154
[58] Field of Search ............................. 264/210.7, 154; 523/124; 524/47, 51, 52

[56] References Cited

U.S. PATENT DOCUMENTS

| 3,867,324 | 2/1975 | Clendinning et al. | 523/124 |
| 4,454,268 | 6/1984 | Otey et al. | 524/47 |
| 5,202,173 | 4/1993 | Wu et al. | 428/131 |

FOREIGN PATENT DOCUMENTS

| 2214918 | 9/1989 | United Kingdom | 524/47 |

*Primary Examiner*—Paul R. Michl
*Assistant Examiner*—Patrick Niland
*Attorney, Agent, or Firm*—Wood, Herron & Evans

[57] ABSTRACT

A biodegradable thermoplastic film is disclosed comprising an alkanoyl polymer, a destructured starch and an ethylene copolymer. The film can be stretched providing breathability and enhancing its biodegradability.

17 Claims, 4 Drawing Sheets

BIODEGRADABLE FILM SURFACE BEFORE STRETCHING 500X

CROSS SECTION OF FIG. 2 AFTER STRETCHING 2000X

AREAS OF ENHANCED BIODEGRADABILITY, ALSO BREATHABLE

20X

AREAS OF BIODEGRADABILITY, BUT NOT BREATHABLE

BIODEGRADABLE FILM AND METHOD OF MAKING SAME

This application is a continuation of application Ser. No. 741,321, filed Aug. 7, 1991, now abandoned.

BACKGROUND OF THE INVENTION

For several decades, it has been a goal of industry to make plastic sheet or film materials either environmentally degradable by sunlight, moisture, temperature and the like or biodegradable by microorganisms. Usually after environmental degradation, plastic sheet or film materials are then more susceptible to assimilation by microorganisms. In spite of considerable efforts, our lands are becoming inundated with plastic sheet or film materials, and articles made therefrom, that will not degrade perhaps for centuries. It is therefore a continuing goal to make plastic sheet or film materials as fully degradable as possible. A biodegradable material is one that undergoes biological degradation which ultimately mineralizes (biodegrades to $CO_2$, water and biomass) in the environment like other known biodegradable matter such as paper and yard waste. It would be highly desirable to provide a plastic sheet or film material that is biodegradable especially in a municipal solid waste facility where it may undergo biodegradation in the presence of heat, moisture and microorganisms.

There is a particular need for biodegradable plastic sheet or film material in disposable diapers, sanitary pads, hygienic pads and the like. These products for practical purposes must satisfy such properties as water impermeability in order to prevent seepage of urine and other human waste products therethrough. In addition, such sheet or film materials must have sufficient tear, tensile and impact strengths to function in such useful articles. The same properties that make them useful, however, lead to their lack of biodegradability. A few examples of patents directed to biodegradable and environmentally degradable compositions or products include U.S. Pat. Nos. 3,901,838; 3,921,333; 4,016,117; 4,021,388; 4,120,576; 4,125,495; 4,218,350 and 4,420,576.

A number of problems exist in connection with certain biodegradable films. For instance, biodegradable thermoplastic starch-based polymeric films are known as disclosed in International Appls. Nos. EP90/01286 and WO91/02025. However, these films tend to be dry, brittle and moisture sensitive. Over time such films absorb water causing them to become soggy and they eventually disintegrate. Although biodegradable, their moisture sensitivity renders them unsuitable for use as moisture barriers in practical applications. Other thermoplastic water impermeable films have been proposed. But such films are usually tough and stiff thereby rendering them uncomfortable for use with diapers, sanitary pads, hygienic pads and the like. Therefore, against this background of prior art, it is evident that further improvements in biodegradable films are needed.

SUMMARY OF THE INVENTION

This invention is directed to a water impermeable and biodegradable thermoplastic film. Also, the film may be provided with a microporous structure to make it breathable. In another form, the film is incrementally stretched to provide unique handling properties and enhance its biodegradability while maintaining its water impermeability.

The biodegradable film comprises a blend of thermoplastic polymers and destructured starch. Each polymeric component of the film is biodegradable. "Biodegradable" means that the polymeric component is susceptible to being assimilated by microorganisms when buried in the ground or otherwise contacted with the organisms under conditions conducive to their growth. Ultimately, the film biodegrades to $CO_2$, water and biomass in the environment like other known biodegradable matter such as paper and yard waste.

One of the thermoplastic polymer components of the biodegradable film is selected from the group consisting of a thermoplastic dialkanoyl polymer and a thermoplastic oxyalkanoyl polymer. Another polymeric component is an ethylene copolymer selected from the group consisting of ethylene-vinyl acetate, hydrolyzed ethylene-vinyl acetate, ethylene-glycidylacrylate, ethylene-methylmethacrylate, ethylene-maleic anhydride, and ethylene-acrylic acid, and mixtures thereof. Destructured starch is the third component of the film. All three polymeric components together are biodegradable to render the polymeric film totally biodegradable.

In a preferred embodiment of this invention the destructured starch and ethylene copolymer components of the biodegradable film are preblended to produce a preblend of starch-based biodegradable thermoplastic copolymer. This preblend comprises a ratio of about 1:9 to 9:1, preferably 1:4 to 4:1, of the starch to the ethylene copolymer. About 5-40% by weight of the preblended starch-based copolymer, preferably about 10-30%, are then preblended with the thermoplastic dialkanoyl or oxyalkanoyl polymer for extrusion to form the film. In its most preferred form, alkanoyl thermoplastic polymer is characterized by at least 10 weight percent of recurring oxycaproyl units. Other additives, stabilizers, slip agents, lubricants, and the like, may be added to the composition.

In another preferred embodiment of the present invention, the biodegradable film is cross directionally stretched forming a breathable film. Producing the breathable film by stretching can be accomplished at low stress levels. Micropores or microvoids can be produced by stretching the biodegradable film at room or ambient temperature in line with the extruder. The film may be heat set at elevated temperatures after stretching. It has been found that the biodegradable film can be cross directionally stretched at ambient temperature to form a breathable film.

In a further embodiment of the present invention, the biodegradable film has a plurality of post-extruded stretched areas along lines spaced substantially uniformly across the film surface areas and through the depth of the film. The stretched areas are separated by unstretched areas and have a thickness less than the unstretched areas. Moreover, the stretched areas weaken the film to further enhance its degradation while maintaining film water impermeability. Severe interdigitating stretching creates porosity in the film. Additionally, the biodegradable film can have a pattern embossed therein. Embossing is usually done during extrusion of the blend prior to stretching.

The biodegradable film can be used for diaper backsheets, sanitary napkins and pads, and other medical, packaging and garment applications. The film is especially suitable for garments because of its breathability, texture, flexibility, and water impermeability.

The biodegradable thermoplastic film of this invention, its method of manufacture and breathability will be better understood with reference to the following detailed description.

Detailed Description of the Invention

A. The Alkanoyl Polymer Component

More particularly, the biodegradable alkanoyl thermoplastic polymers which are suitable in the practice of the invention are the normally-solid oxyalkanoyl polymers and the normally-solid dialkanoyl polymers. These polymers are fully described in U.S. Pat. Nos. 3,921,333 and 3,901,838 and their disclosures are fully incorporated herein by reference for an understanding of the alkanoyl polymer component. Such polymers usually possess a reduced viscosity value of at least about 0.1 and upwards to about 12, and higher. Those polymers having a wide span of usefulness possess a reduced viscosity value in the range of from about 0.2 to about 8. The normally-solid thermoplastic dialkanoyl polymers are further characterized in that they contain at least about 10 weight percent, desirably greater than about 20 weight percent, for the recurring linear dialkanoyl-containing unit of the formula:

wherein R represents a divalent aliphatic hydrocarbon radical and wherein R' represents a divalent aliphatic hydrocarbon radical or a divalent aliphatic oxahydrocarbon radical.

The normally-solid thermoplastic oxyalkanoyl polymers, on the other hand, are characterized in that they contain at least about 10 weight percent, desirably greater than about 20 weight percent, of the oxyalkanoyl unit

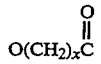

recurring therein, wherein x is an integer having a value of 2–7.

The biodegradable thermoplastic alkanoyl polymer most preferred in the practice of this invention is characterized by at least 10 weight percent of recurring oxycaproyl units of the formula

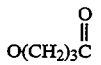

The thermoplastic dialkanoyl polymers can be prepared by known methods. A general procedure for the preparation of poly(alkylene alkanedioate) glycols (or dicarboxy compounds) involves well-documented esterification techniques using predetermined amounts of an aliphatic diol and an alkanedioic acid as referred to in U.S. Pat. No. 3,901,838.

The thermoplastic oxyalkanoyl polymers can also be prepared by various methods. A general procedure involves reacting a large molar excess of the appropriate lactone, e.g., epsilon-caprolactone, zeta-enantholactone, and/or eta-caprylolactone with an organic initiator which contains two active hydrogen groups, e.g., hydroxyl, carboxyl, primary amino, secondary amino, and mixtures thereof, such groups being capable of opening the lactone ring whereby it adds as a linear chain (of recurring oxyalkanoyl units) to the site of the active hydrogen-containing group, at an elevated temperature, preferably in the presence of a catalyst, and for a period of time sufficient to produce the desired polymers. Thermoplastic oxycaproxyl polymers can also be prepared by reacting the cyclic ester, e.g., epsilon-caprolactone, and/or the corresponding hydroxyacid e.g., 6-hydroxycaproic acid, and/or their oligomers, with a mixture comprising diol and dicarboxylic acid, using a molar excess of diol with relation to the dicarboxylic acid, or alternatively, using a molar excess of dicarboxylic acid with relation to the diol. These methods are further described in U.S. Pat. No. 3,901,838.

B. The Destructured Starch Component

The term "starch" as used in the present description and in the claims covers in general all the starches of natural or vegetable origin composed essentially of amylose and amylopectin. They can be extracted from various plants, such as, for example, potatoes, rice, tapioca, maize and cereals such as rye, oats and wheat. Maize starch is usually preferred. The term "starch" also covers modified starches whose acidity index has been reduced to between 3 and 6, as well as potato starch in which the type and concentration of the cations associated with the phosphate group have been modified. Starch ethoxylates, starch acetates, cationic starches, oxidized starches, cross-linked starches and the like may be used in the preparation of the compositions according to the invention. The starch is destructured by well known techniques as disclosed in PCT Application No. EP 90/01286, WO 91/02025 and this publication is incorporated herein in its entirety.

The process of destructuring the starch may vary, such as during extrusion, when extrusion is preferably carried with the addition of water the concentration of which may reach values of up to 20% by weight, preferably up to 15%, of the total weight of the composition supplied. This value includes the intrinsic bound water content of the starch used and any water added as required. The water content is at any rate reduced to values below 6%, preferably below 4% by weight by degassing at the output of the extruder or in an intermediate degassing stage interposed between a mixing stage and a transportation and compression stage, or even by the drying of the granulate at 70° C. for 8 hours after the extrusion. Further details may be had with reference to WO 91/020250.

C. Ethylene Copolymer Component

In its most preferred form, the destructured starch is preblended with an ethylene copolymer selected from the group consisting of ethylene-vinyl acetate (EVA) having a vinyl acetate molar content of from 5 to 90%, hydrolyzed ethylene-vinyl acetate having from 5 to 90% of hydrolized acetate groups, ethylene-glycidyl acrylate (EGA), ethylene-methyl methacrylate (EMM), ethylene-maleic anhydride (EMA) and mixtures thereof.

Of these polymers, the above defined ethylene-vinyl acetate copolymer is preferred particularly for the production of compositions for films and particularly preferred are ethylene-vinyl acetate copolymers having a vinyl acetate molar content of from 12 to 80%. Copolymers of ethylene-vinyl acetate are available commercially.

In the blended composition, destructured starch and the ethylene copolymer may be present in a ratio of from 1:9 to 9:1, preferably from 1:4 to 4:1. The ethylene copolymers mentioned above may be used in mixtures with each other or, to advantage, may be mixed with an ethylene-acrylic acid (EAA) copolymer whose use in biodegradable starch compositions is described in U.S. Pat. No. 4,133,784.

The method of preparing the compositions according to the invention is carried out in an extruder at a temperature of between 80° and 180° C., under conditions such as to destructure the starch as described above.

If a mixture of ethylene copolymers and, in particular, a mixture of ethylene-vinyl acetate and ethylene acrylic acid is used, a blend is preferably produced beforehand by the mixing of the copolymers in an extruder and the pelletising of the extrusion. In a second stage, the pellets are then mixed with starch with the addition of water and any of the destructuring and plasticizing agents mentioned above, in a heated extruder under conditions such as to destructure the starch.

D. Biodegradable Film Extrusion

The above starch-based thermoplastic copolymer preblend is dry blended with the previously described thermoplastic alkanoyl polymer and is extruded to form the biodegradable film. For purposes of the invention, extrusion of the above biodegradable thermoplastic film formulation is achieved by the use of an extruder and a die. The die temperature ranges from about 240° F. to 285° F. The films are slot die extruded using a 2½" extruder at the barrel temperatures from about 200° F. to 225° F. Typically, depending on extrusion conditions, a biodegradable film of this invention extruded into films from about 1 to 20 mils, preferably 1-10 mils, can be produced at approximately 65 fpm line speed when a 2½" extruder is used with a screw speed of approximately 50 rpm. The presently described biodegradable film is made according to this procedure. It is to be understood that the extrusion techniques are well known to those versed in the art and need not be discussed in further detail.

E. Cross Directional Stretching

By cross directionally stretching the extruded biodegradable film, the molecular structure of the film fractures creating micropores or microvoids. The microvoid formation causes breathability in the biodegradable thermoplastic film. The breathability allows air and moisture vapor to breathe or pass through the film. Further, the increased surface area by stretching the film accordingly enhances the biodegradability of the film.

Various types of stretching techniques can be employed to vary the degrees of breathability and enhanced biodegradation. Upon stretching, the translucent film becomes opaque without the addition of any opacifiers such as titanium dioxide. The opacity of the film is the result of light trapped in the microvoids or micropores caused by the molecular fracture of the biodegradable film.

F. Incremental Stretching

After extruding the blended formulation of the film, the biodegradable film may also be stretched in accordance with incremental stretching techniques described in copending application Ser. No. 07/478,935, filed Feb. 12, 1990 in the names of Pai-Chuan Wu, Thomas R. Ryle, Robert M. Mortellite and J. David Toppen and the details of such stretching are incorporated herein by reference. One of the stretchers and techniques disclosed therein is described as follows:

1. Diagonal Intermeshing Stretcher

The diagonal intermeshing stretcher consists of a pair of left hand and right hand helical gear-like elements on parallel shafts. The shafts are disposed between two machine side plates, the lower shaft being located in fixed bearings and the upper shaft being located in bearings in vertically slidable members. The slidable members are adjustable in the vertical direction by wedge shaped elements operable by adjusting screws. Screwing the wedges out or in will move the vertically slidable member respectively down or up to further engage or disengage the gear-like teeth of the upper intermeshing roll with the lower intermeshing roll. Micrometers mounted to the side frames are operable to indicate the depth of engagement of the teeth of the intermeshing roll.

Air cylinders are employed to hold the slidable members in their lower engaged position firmly against the adjusting wedges to oppose the upward force exerted by the material being stretched. These cylinders may also be retracted to disengage the upper and lower intermeshing rolls from each other for purposes of threading material through the intermeshing equipment or in conjunction with a safety circuit which would open all machine nip points when activated.

A drive means is typically utilized to drive the stationary intermeshing roll. If the upper intermeshing roll is to be disengagable for purposes of machine threading or safety, it is preferable to use an antibacklash gearing arrangement between the upper and lower intermeshing rolls to assure that upon reengagement the teeth of one intermeshing roll always fall between the teeth of the other intermeshing roll and potentially damaging physical contact between addendums of intermeshing teeth is avoided. If the intermeshing rolls are to remain in constant engagement, the upper intermeshing roll typically need not be driven. Drive may be accomplished by the driven intermeshing roll through the material being stretched.

The intermeshing rolls closely resemble fine pitch helical gears. In the preferred embodiment, the rolls have 5.935" diameter, 45° helix angle, a 0.100" normal pitch, 30 diametral pitch, 14½° pressure angle, and are basically a long addendum topped gear. This produces a narrow, deep tooth profile which allows up to about 0.090" of intermeshing engagement and about 0.005" clearance on the sides of the tooth for material thickness. The teeth are not designed to transmit rotational torque and do not contact metal-to-metal in normal intermeshing stretching operation.

2. Incremental Stretching Technique

The above described diagonal intermeshing stretcher is employed in this example to produce the incrementally stretched embossed or unembossed biodegradable film. The stretching operation occurs after the biodegradable film is extruded in a manner similar to Example 8 and has solidified to permit incremental stretching. The woven taffeta pattern in accordance with U.S. Pat. No. 3,484,835 is provided in this example and the biodegradable film is incrementally stretched using the diagonal intermeshing stretcher. Upon stretching with one pass through the diagonal intermeshing stretcher with a depth of roller engagement at about 0.085", an embossed film provides post-embossed stretched areas.

The original emboss in the unstretched areas is mostly intact. During the stretching process, the thin areas will stretch preferentially to the thick areas due to the lower resistance to the stretching force. In addition, the stretching process weakens and increases the overall area of the biodegradable film by about 44%. Stretched films having thicknesses of about 1-10 mils are provided. The area increase effected by diagonal stretching consists of dimensional increases in both the machine and cross direction. The weakened biodegradable film enables degradation to occur more readily yet the film is impermeable to water so as to function as a water barrier backsheet for diapers and pads.

Detailed Examples of the Invention

The following examples illustrate biodegradable films of this invention and methods of making the biodegradable films. In light of these examples and this further detailed description, it will become apparent to a person of ordinary skill in the art that variations thereof may be made without departing from the scope of this invention.

The invention will also be further understood with reference to the drawings in which.

EXAMPLES 1-5

Figure 1:
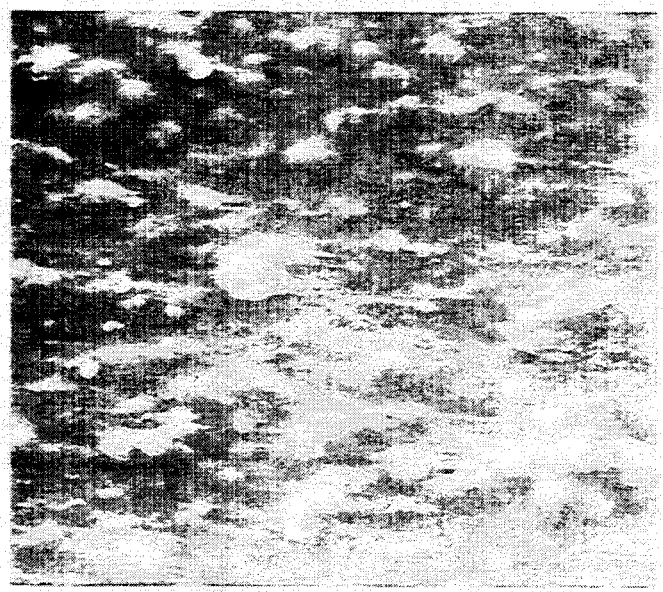
FIG. 1 is a an enlarged photographic view of the biodegradable film surface before stretching.

Different blended ratios of polycaprolactone (Union Carbide's Tone Polymer, PCL-787) and modified starch ethylene copolymer blend (Novamont's Mater-BI AF05H) were slot die extruded into films from 2.0-3.5 mils by using a 2.5" extruder with a screw speed of approximately 50 rpm and extrusion speed of approximately 35-50 fpm at a melt temperature of about 300° F. This alkanoyl polymer and modified starch based ethylene copolymer was made in accordance with the teachings of the above-incorporated patents by reference.

The extruded films were mechanically stretched cross machine directionally at speeds typically between 5 to 50 inches per minute at ambient temperature.

For comparison, it is noted that 100% PCL film as well as 100% modified starch ethylene copolymer film do not turn into pearl-like opaque film upon stretching (see Table, Examples 1 and 5). However, blends in accordance with this invention (see Table, Examples 2 and 3) do form micropores/microvoids upon stretching. The microvoids/micropores are small enough that they will trap the light in the film producing opacity as evidenced by the light transmission measurement. It is also noticed that at 40% modified starch polymer loading (see Table, Example 4), the film's microvoids upon cross direction stretching (CD) are reduced.

These films with or without stretching are easily extrudable and suitable for any biodegradable film application.

TABLE 1

|  | EXAMPLE 1 | EXAMPLE 2 | EXAMPLE 3 | EXAMPLE 4 | EXAMPLE 5 |
|---|---|---|---|---|---|
| PCL-787 (%) | 100 | 90 | 80 | 60 | 0 |
| AF05H (%) | 0 | 10 | 20 | 40 | 100 |
| Gauge before stretching (mil) | 2.4 | 3.0 | 3.0 | 3.5 | 2.0 |
| Gauge after stretching (mil) | 0.8 | 1.2 | 1.4 | 2.0 | 1.0 |
| Light transmission (%) before stretching | 88 | 80 | 80 | 84 | 88 |
| Light transmission after stretching (%) | 91 | 35 | 25 | 70 | 89 |

EXAMPLE 6

A 80% PCL-787 and 20% AF05H composition was dry blended and melt slot die extruded into a film at 2.8 mils. The film was stretched in the CD direction with an initial width of 6" to a final width of 15" at a stretching rate of 12"/min. As a result of the stretching, the film formed microvoids.

The microvoid formation and CD stretching turned the film into a pearl-like opaque film (light transmission measurement) and enhanced the MD direction tear strength as evidenced by the data compiled in Table 2.

These films are suitable for any packaging film, disposable diaper backsheet, sanitary napkin film, printable films and many other applications where biodegradability, breathability and enhanced biodegradability are needed.

TABLE 2

|  | BEFORE STRETCHING | AFTER STRETCHING |
|---|---|---|
| Gauge (Mil) | 2.8 | 1.2 |
| Light transmission (%) | 89 | 32 |
| Elmendorf Unnotched Tear (Grams) |  |  |
| MD | 180 | 560 |
| CD | 700 | 610 |
| Ultimate Tensile Strength (PSI) |  |  |
| MD | 3300 | 1630 |

TABLE 2-continued

| | BEFORE STRETCHING | AFTER STRETCHING |
|---|---|---|
| CD | 2100 | 6800 |

EXAMPLE 7

An 80% Union Carbide Tone Polymer PCL-787 and 20% Novamont Mater-BI AF05H composition was dry blended and melt slot die casted into a film of 3.0 mils film using a 2.5" extruder with a screw speed of approximately 50 rpm and extrusion speed of approximately 40 fpm.

The above film was then cross machine directionally stretched at 10 inches/min rate at ambient temperature producing a 1.5 mils pearl-like opaque film.

Figure 5:
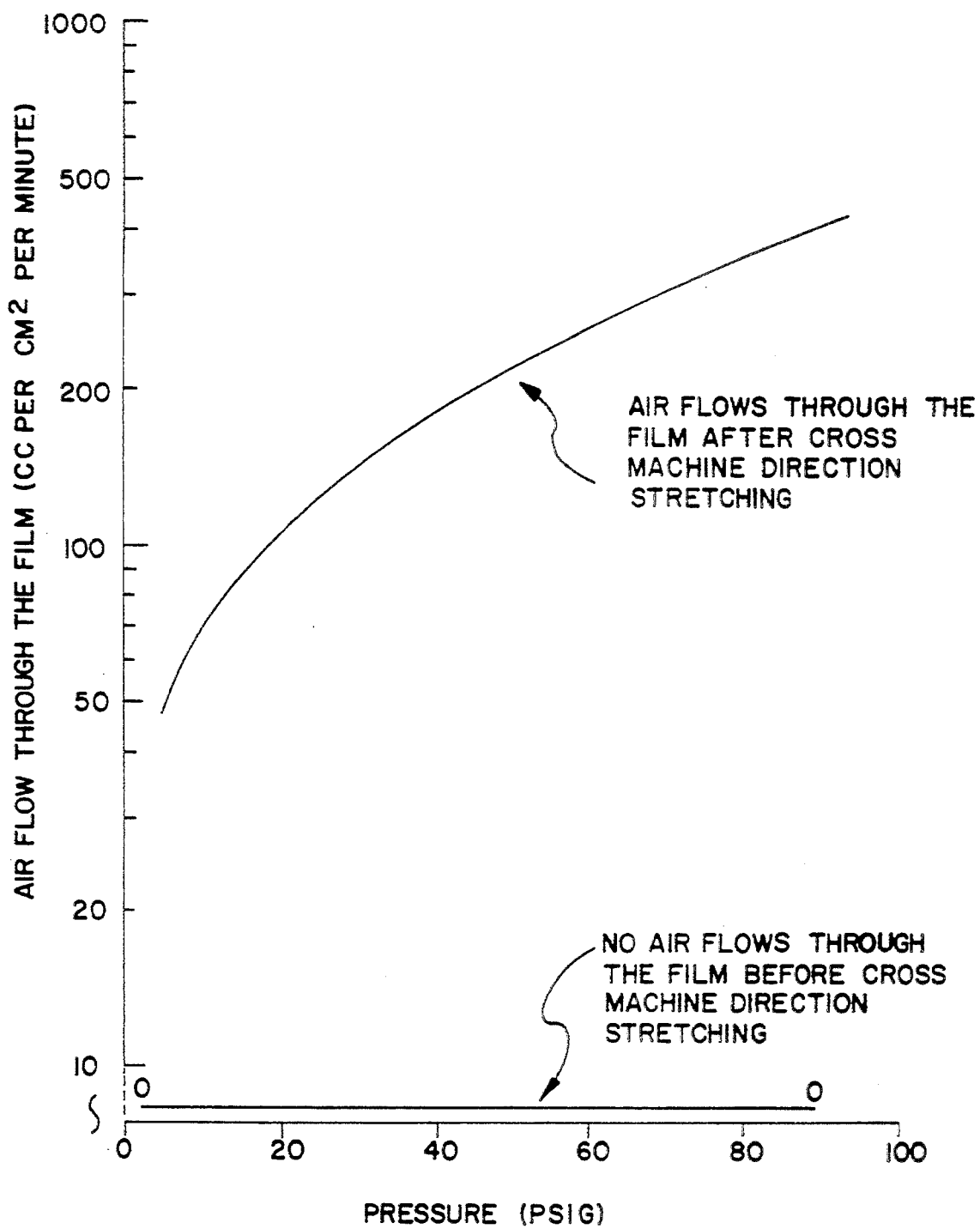
FIG. 5 is a graph indicating air flow through the biodegradable film after cross-machine directional stretching.
Figure 6:
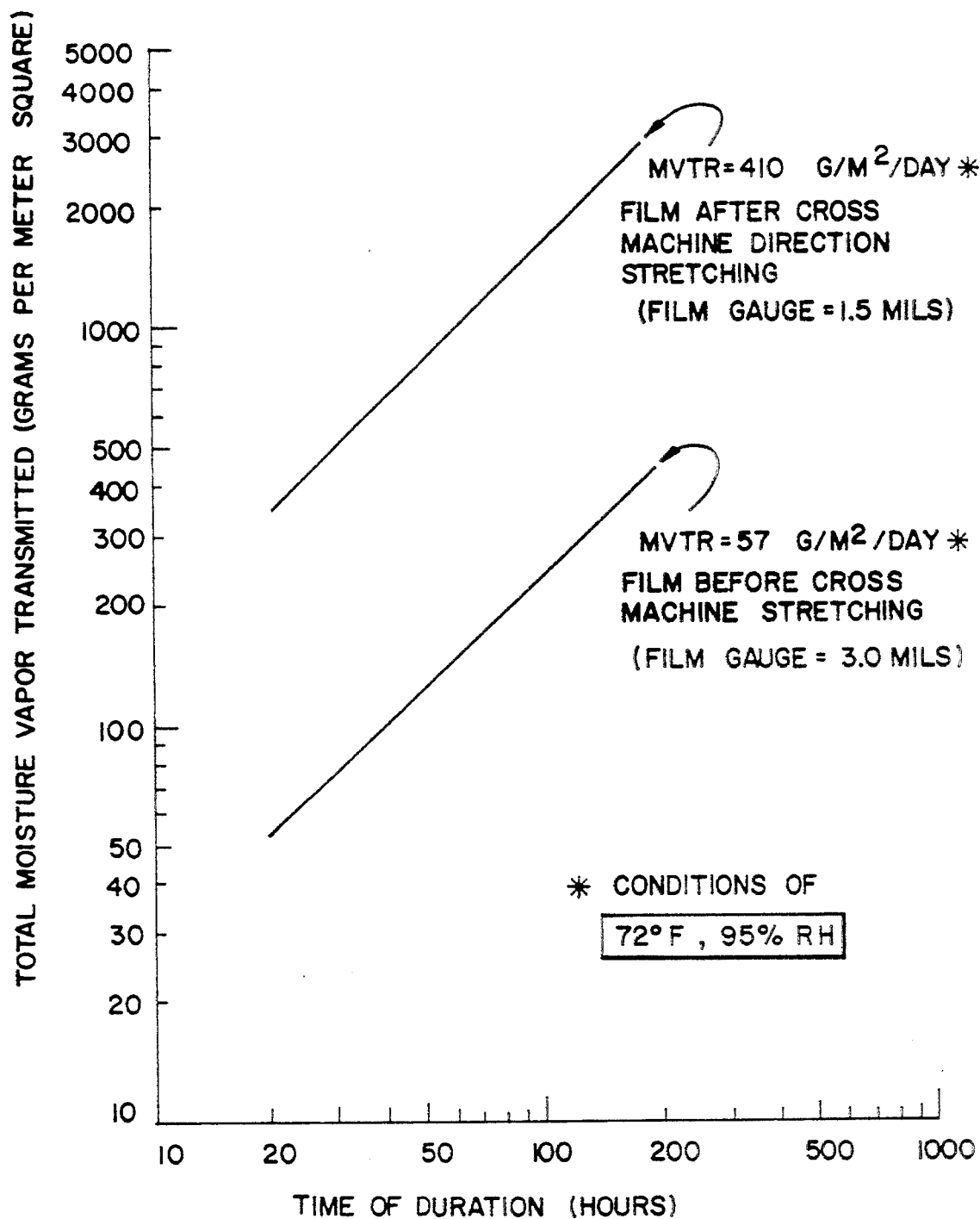
FIG. 6 is a graph illustrating the increase in total moisture vapor transmission through the biodegradable film after cross-machine directional stretching.

Since the polymeric materials used are biodegradable and the resulted film has microporous structure which will give air flow through the film as well as increase the moisture vapor transmission rate, the film is breathable with enhanced biodegradability (see Table 3 and FIGS. 5 and 6).

Figure 2:
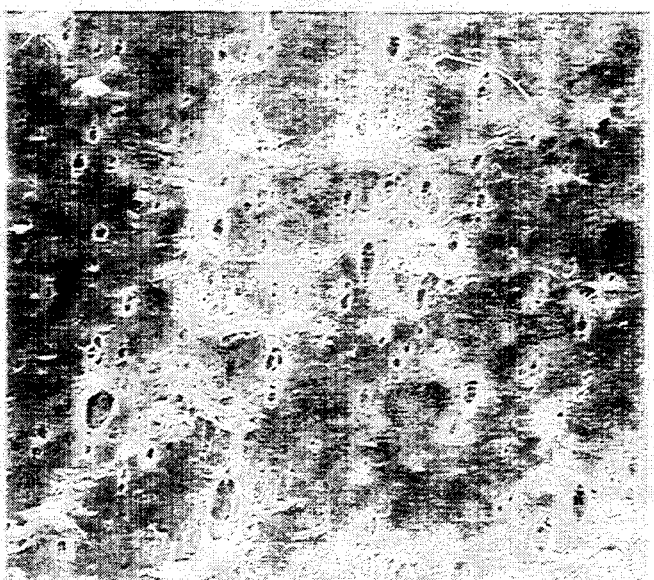
FIG. 2 is a an enlarged photographic view of the biodegradable film surface after stretching illustrating micropore formation.
Figure 3:
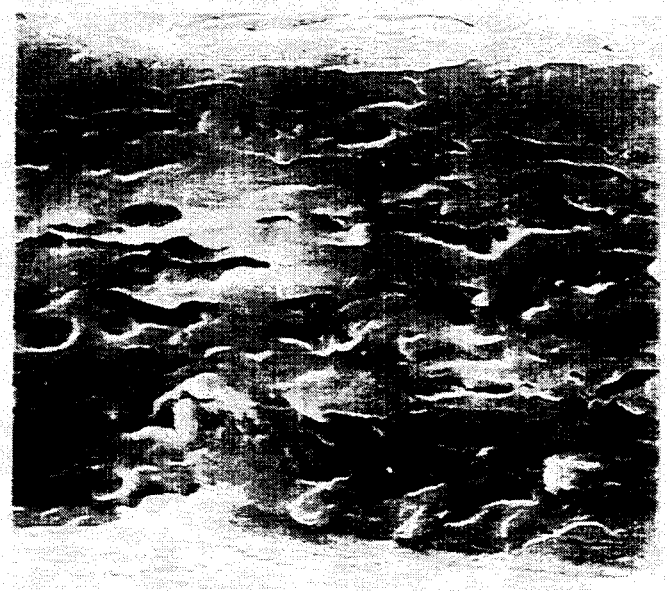
FIG. 3 is an enlarged photographic cross-sectional view of the biodegradable film of FIG. 2 illustrating micropore formation through the depth of a biodegradable film.

The evidence of microporous formations are shown in FIGS. 2 (surface) and 3 (cross section).

EXAMPLE 8

An 80% Union Carbide Tone Polymer PCL-787 and 20% Novamont Mater-BI AF05H composition was dry blended and melt slot die casted into a film of 3.0 mils film as disclosed in Example 7.

The above film was then double stretched by using the diagonal intermeshing stretcher described above. On the cross machine direction, the depth of the engagement of the stretcher is 0.080" and the rate of stretching is 100 fpm.

Figure 4:
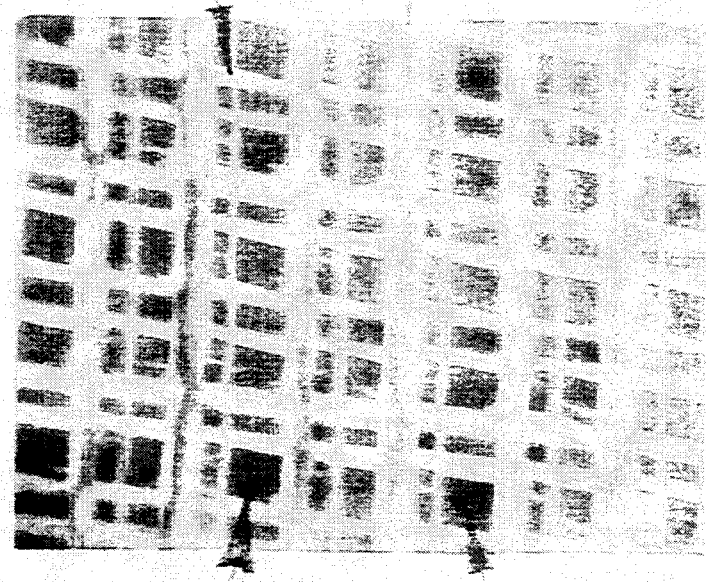
FIG. 4 is an enlarged photographic view of the biodegradable film after double cross-machine direction diagonal stretching illustrating a woven-like structure with breathable microvoid lines and non-breathable non-microvoid areas.

FIG. 4 shows the result of this biodegradable film after double cross machine direction diagonal stretching. A woven-like structure with microvoid lines and non-microvoid areas was formed as shown. Accordingly, the film will have increased moisture vapor transmission rate as well as added air flow. This film is breathable and has enhanced biodegradability suitable for garment applications.

EXAMPLE 9

As mentioned in Examples 1-5, these films with or without stretching are easily extrudable and suitable for any biodegradable film application. The advantages of stretched films are already given in Examples 6-8. The application of film without stretching can be further demonstrated in this example.

An 80% PCL and 20% AFO5H composition was dry blended and melt slot die extruded into a film of 1.25 mils by using a 2.5" extruder with a screw speed of 50 rpm and the line speed at 60 fpm. The four zones' barrel temperatures of the extruder are 200°, 205°, 230° and 240° F., respectively. The five zones' slot die temperatures are 220°, 280°, 315°, 290°, and 220° F., respectively. The film is embossed by a rubber roll and metal embossing roll. The rubber roll surface was cooled by water at 80° F. and the metal roll surface was cooled by circulating the 80° F. water inside the roll.

The resulting embossed film at 1.25 mils is suitable for disposable diaper backsheet, sanitary napkin, and many other applications where the biodegradable characteristic is required. The mechanical strength of such film is listed in Table 4.

TABLE 3

BREATHABLE FILM WITH ENHANCED BIODEGRADABILITY

| DESCRIPTION OF THE FILM | GAUGE (MILS) | LIGHT TRANSMISSION (%) | AIR* FLOW CC/MIN/CM$^2$ AT 20 PSIG | MOISTURE VAPOR** TRANSMISSION RATE GRAMS/M$^2$/DAY AT 72° F. 95% RH | WATER*** INTRUSION PRESSURE (PSIG) |
|---|---|---|---|---|---|
| BEFORE STRETCHING | 3.0 | 85 | 0 | 57 | 90+ |
| AFTER STRETCHING | 1.5 | 24 | 100 | 410 | 90+ |

*It is breathable (see FIG. 5).
**Its moisture vapor transmission rate also increased (see FIG. 6).
***Water intrusion pressure is the water column pressure when the first water drop appeared on the opposite side of the film.

TABLE 4

MECHANICAL PROPERTIES OF BIODEGRADABLE FILM ACCORDING TO EXAMPLE 9 AT 1.25 MILS

| | Ultimate Tensile (Grams/Inch) | Elongation* at Break (%) | Elmendorf** Tear Strength (Grams) | | Tensile* Strength at 10% Elongation | Tensile Strength at 25% Elongation (Grams/Inch) |
|---|---|---|---|---|---|---|
| | | | Unnotched | Notched | | |
| Machine Direction | 2200 | 600 | 240 | 60 | 650 | 750 |
| Cross Machine Direction | 1500 | 650 | 620 | 370 | 600 | 660 |

*ASTM Testing Method D-882
**ASTM Testing Method D-1922
(In addition, not dependent upon direction impact strength F$_{50}$ (grams) was 250 (ASTM Testing Method D-1709), coefficient of friction was 0.7, and light transmission (%) was 89% (The light transmission can be reduced by adding TiO$_2$, if opacity is needed or preferred.).)

Having described this invention and its various embodiments and parameters, other variations will become apparent to a person of ordinary skill in this art in view of this description.

What is claimed is:

1. A biodegradable thermoplastic film having water impermeable and flexible properties comprising a blend of
   (a) an alkanoyl thermoplastic polymer selected from the group consisting of
      (i) a thermoplastic dialkanoyl polymer characterized in that at least about 10 weight percent of said polymer is attributable to recurring dialkanoyl units of the formula

wherein R represents a divalent aliphatic hydrocarbon radical; and wherein R' is of the group consisting of divalent aliphatic hydrocarbon radicals and divalent aliphatic oxahydrocarbon radicals, and (ii) a thermoplastic oxyalkanoyl polymer of the formula

wherein x is an integer having a value of about 2 to 7 and mixtures thereof, (b) a destructured starch and (c) a copolymer selected from the group consisting of ethylene-vinyl acetate, hydrolyzed ethylene-vinyl acetate, ethylene-glycidyl acrylate, ethylene-methyl methacrylate, ethylene-maleic anhydride, and ethylene-acrylic acid, and mixtures thereof, wherein said (b) and (c) components are preblended to make a starch-based thermoplastic polymer which is contained in an amount of about 5 to 40% by weight of said film.

2. The biodegradable film of claim 1 wherein said film is stretched at ambient temperature to form a breathable film.

3. The biodegradable film of claim 2 wherein said film has a plurality of post extruded stretched areas along lines spaced substantially uniformly across the film surface areas and through the depth of the film, said stretched areas being separated by unstretched areas and having a thickness less than the unstretched areas, said stretched areas for weakening said film to further enhance its degradation while maintaining its water impermeability.

4. The biodegradable film of claim 1 wherein said oxyalkanoyl thermoplastic polymer is characterized by at least 10 weight percent of recurring oxycaproyl units of the formula

5. The biodegradable film of claim 1 wherein said thermoplastic alkanoyl polymer and starch-based thermoplastic polymer are extruded to form said film.

6. A biodegradable extruded film having water impermeable, flexible and textural properties for comfort as a garment suitable for use in diapers, sanitary, medical and the like applications comprising a blend of a biodegradable alkanoyl thermoplastic polymer selected from the group consisting of (a) a thermoplastic dialkanoyl polymer characterized in that at least about 10 weight percent of said polymer is attributable to recurring dialkanoyl units of the formula

wherein R represents a divalent aliphatic hydrocarbon radical; and wherein R' is of the group consisting of divalent aliphatic hydrocarbon radicals and divalent aliphatic oxahydrocarbon radicals, and (b) a thermoplastic oxyalkanoyl polymer of the formula

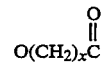

wherein x is an integer having a value of about 2 to 7; and a biodegradable starch-based thermoplastic polymer containing a blend destructured starch and a copolymer selected from the group consisting of ethylene-vinyl acetate, ethylene-glycidyl acrylate, ethylene-methyl methacrylate, ethylene-maleic anhydride, and ethylene-acrylic acid, and mixtures thereof, wherein said film comprises about 10 to about 30% by weight of said starch-based polymer and is stretched at ambient temperature to form a breathable film.

7. The biodegradable film of claim 6 wherein said film has a plurality of post extruded stretched areas along lines spaced substantially uniformly across the film surface areas and through the depth of the film, said stretched areas being separated by unstretched areas and having a thickness less than the unstretched areas, said stretched areas for weakening said film to further enhance its degradation while maintaining its water impermeability.

8. The biodegradable film of claim 7 wherein said film has a pattern embossed therein and said plurality of stretched areas are post-embossed through the depth of the embossed film.

9. The biodegradable film of claim 1 wherein said film has a thickness of about 1 to about 20 mils.

10. The biodegradable film of claim 1 wherein said dialkanoyl thermoplastic polymer is polycaprolactone.

11. A method of making the biodegradable film of claim 1 comprising extruding a blend of said (a), (b) and (c) components to form said film.

12. The method of claim 11 comprising cross-directionally stretching the extruded film to form a breathable film.

13. The method of claim 11 wherein said cross-directional stretching is at ambient temperature.

14. The method of claim 11 comprising interdigitatingly stretching said extruded film along lines spaced substantially uniformly across the surfaces thereof and through the depth of the film, said stretched areas being separated by unstretched areas and having a thickness less than the unstretched areas, said stretched areas for weakening the strength of said film to further enhance its degradation while maintaining its water impermeability.

15. The method of claim 11 comprising the further step of embossing the extruded film.

16. The method of claim 12 wherein said film has a thickness of about 1 to about 10 mils after stretching.

17. The method of claim 11 wherein said dialkanoyl thermoplastic polymer component is a polycaprolactone.

* * * * *